US008706343B2

(12) United States Patent
Streib

(10) Patent No.: US 8,706,343 B2
(45) Date of Patent: Apr. 22, 2014

(54) METHOD FOR DETECTING LEAKS IN A TANK SYSTEM

(75) Inventor: Martin Streib, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 481 days.

(21) Appl. No.: 12/995,950

(22) PCT Filed: Nov. 28, 2008

(86) PCT No.: PCT/EP2008/066408
§ 371 (c)(1),
(2), (4) Date: Apr. 7, 2011

(87) PCT Pub. No.: WO2009/146757
PCT Pub. Date: Dec. 10, 2009

(65) Prior Publication Data
US 2011/0178674 A1 Jul. 21, 2011

(30) Foreign Application Priority Data
Jun. 5, 2008 (DE) ......................... 10 2008 002 224

(51) Int. Cl.
*G01M 3/04* (2006.01)

(52) U.S. Cl.
USPC ............. 701/29.1; 702/140; 73/49.7; 73/45.5

(58) Field of Classification Search
USPC ...................... 701/29; 702/140; 73/45.5, 49.7
See application file for complete search history.

(56) References Cited

U.S. PATENT DOCUMENTS

| | | | | |
|---|---|---|---|---|
| 6,321,727 | B1 | 11/2001 | Reddy et al. | |
| 6,782,873 | B2 | 8/2004 | Streib | |
| 7,077,112 | B2 | 7/2006 | Mitani et al. | |
| 2004/0154596 | A1 | 8/2004 | Mitani et al. | |
| 2005/0080589 | A1 * | 4/2005 | Tiberi | 702/140 |
| 2007/0204675 | A1 | 9/2007 | Herzog et al. | |

FOREIGN PATENT DOCUMENTS

| | | |
|---|---|---|
| CN | 1526937 | 9/2004 |
| DE | 100 12 778 | 9/2001 |
| DE | 101 43 327 | 3/2003 |
| DE | 10 2004 005 933 | 11/2004 |
| GB | 2 325 983 | 12/1998 |
| JP | 2004-293296 | 10/2004 |
| JP | 2005-325744 | 11/2005 |

OTHER PUBLICATIONS

Andersson et al. "Diagnosis of Evaporative leaks and sensor faults in a vehicle fuel system." *IFAC Workshop on Advances in Automotive Control*. 2001. pp. 261-266.

* cited by examiner

*Primary Examiner* — Helal A Algahaim
*Assistant Examiner* — Yazan A Soofi
(74) *Attorney, Agent, or Firm* — Merchant & Gould P.C.

(57) ABSTRACT

The invention relates to a method for preparing models of technical devices, wherein each technical device comprises units that are connected to each other by means of connection point, wherein, when performing the method, at least one structure made of units connected to each other by means of connection points comprising commonalities for all technical devices is integrated and automatically described as at least one common module (8) for all models.

12 Claims, 2 Drawing Sheets

METHOD FOR DETECTING LEAKS IN A TANK SYSTEM

This application is a National Stage Application of PCT/EP2008/066408, filed 28 Nov. 2008, which claims benefit of Serial No. 10 2008 002 224.1, filed 5 Jun. 2008 in 5 Jun. 2008 and which applications are incorporated herein by reference. To the extent appropriate, a claim of priority is made to each of the above disclosed applications.

The present invention relates to a method for detecting leaks in a tank system, particularly in motor vehicles, wherein the presence of leaks is inferred from pressure changes in the tank system in response to externally caused pressure fluctuations.

In different markets, for example USA, Canada and Korea, lawmakers are already requiring a detection of defects in liquid tightness (leaks) in the tank or in the tank system in order to detect possible sources of fuel emissions and if possible to correct the problem. Existing methods designed for this purpose are often based on a detection of pressure changes which occur in the tank system in response to external pressure fluctuations. The external pressure fluctuations can be caused by ambient conditions such as, e.g., temperature fluctuations or can be brought about by a targeted intervention. In the case of an existing leak in the tank, a negative pressure or a positive pressure brought about in this way gradually rises or, respectively, falls when the valve is closed because ambient air can flow into the tank via the leak. By means of simple pressure measuring, the presence of a leak in the tank or in the entire tank system can therefore be determined. Such pressure changes can, for example, be detected by pressure sensors disposed in the fuel tank.

For example, a negative pressure can be produced in the system in that by opening a tank ventilation valve between the tank or, respectively, the active charcoal filter and the intake manifold, fuel vapors from the tank system are evacuated by means of the negative pressure present in the intake manifold when the engine is idling. In the case of a hermetically sealed tank system, the existing negative pressure remains intact over an extended period of time in the tank or the tank system when the valves are closed. In the case of defects in liquid tightness or rather leaks being present, said negative pressure breaks down faster, and therefore the presence of said defects in liquid tightness can be inferred from the pressure increase or, respectively, the break down of the negative pressure detected using the pressure sensors.

In other methods, a positive or negative pressure is introduced into the tank by means, for example, of an electric pump for detecting leaks. In so doing, the speed of the drop in pressure or the increase in pressure is, for example, determined directly using a sensor or indirectly by observing the power consumption of the pump and the presence of a leak is inferred from this information. It is furthermore possible to close off the tank during the switching-off phase and to observe to what extent natural temperature fluctuations lead to corresponding pressure changes. The hermeticity of or as the case may be leaks in the tank system can be inferred as a function of the pressure changes which have been determined.

The utilization of a positive pressure, for example by heating the contents of the tank, has admittedly the decisive disadvantage for a hermeticity test that fuel-laden gases or vapors can escape to the environment when a leakage in an active charcoal filter exists. For that reason, the German patent publication DE 100 12 778 A1 takes the gas temperature or, respectively, the vapor temperature into account when carrying out a leak test. Predictions are thereby made as to whether a positive pressure in the fuel tank system is to be expected with respect to a corresponding ambient pressure. In this case, the leak test is not performed and the fuel vapors are arrested by the active charcoal filter.

The inherent problem of these methods for detecting leaks from prior art, in which the pressure in the tank is changed, is that the detection of leaks can be distorted by the fact that additional pressure changes can simultaneously occur on account of temperature influences when performing the method. Temperature fluctuations can bring about an expansion or compression as well as an evaporation of the fuel from the liquid phase into the gaseous phase or a condensation thereof from the gaseous face into the liquid phase.

The accuracy of the leak diagnosis is reduced on account of these kinds of additional effects. In the worst case scenario, this can result in an existing leak not being found or in a leak being falsely diagnosed in a hermetically sealed system.

In methods from prior art, which base the leak diagnosis on pressure changes that result from natural temperature fluctuations, said temperature fluctuations are as a rule not quantitatively taken into account. In fact, it is only taken into account in very general terms whether the pressure change in the tank exceeds a certain margin of fluctuation. The hermeticity of the system is then inferred from this information. Provided the determined margin of fluctuation is not exceeded, the presence of leaks can be inferred. Because the natural temperature fluctuations can turn out very differently, a considerable tolerance in the leak detection threshold thereby results.

The first publication of the German patent application DE 101 43 327 A1 already takes the effect of temperature on the fuel evaporation during a leak diagnosis into account by a correction variable, which is a function of the fuel temperature, being introduced into the method.

Current legal specifications require a detection of leaks having a diameter of 0.5 mm. This opens up the possibility of specifying the threshold values for the diagnoses in such a way that the leak detection threshold lies in the ideal case, for example, at 0.35 mm. In the case of prevailing conditions which upwardly displace the leak detection threshold, a 0.5 mm leak is however still reliably detected. In the opposite case, i.e. under conditions which downwardly displace the detection threshold, a 0.0 mm leak, in other words a hermetically sealed system, is still detected as hermetically sealed.

Particularly in multi-part tank systems, as said systems are used in different hybrid vehicles, the currently required detection threshold is however problematic. For example, in two-part tank systems, both subspaces have to be in each case discretely diagnosed for leaks. In this case, the limit value 0.5 mm is in effect for the sum of all leaks. The leak diagnoses for the subspaces must therefore take place using tighter threshold values than 0.5. The known methods for detecting leaks having considerable fluctuations in the leak detection thresholds due to temperature fluctuations are therefore less suited, in particular in the aforementioned multi-part systems, to allowing for a reliable diagnosis.

It is therefore the aim of the invention to provide a method for detecting leaks, which avoids the disadvantages described from prior art. The method shall particularly reduce the margins of fluctuation for detecting leaks, which are caused by the changing ambient conditions, in order to facilitate a safe and reliable diagnosis of defects in liquid tightness in tank systems.

SUMMARY

Advantages of the Invention

The method according to the invention for detecting leaks in a tank system, particularly in motor vehicles, infers the presence of leaks from pressure changes in the tank system which occur in response to externally caused pressure fluctuations. Said externally caused pressure fluctuations can be brought about by changing ambient conditions or by targeted interventions. According to the invention, the effect of temperature in the tank system is hereby taken into account. In so doing, an expected pressure change in the tank system for a predetermined leak size is determined as a function of the temperature, and the presence of leaks is inferred from the comparison of an actual pressure change to the expected pressure change. Said method facilitates a substantially more accurate and more reliable detection of leaks in tank systems by providing a greater degree of selectivity in the leak diagnosis than is possible in conventional methods. The taking of the temperature into account when performing the method allows for a qualitative acquisition of temperature dependent volume changes, in particular expansions or compressions, as well as changes in the aggregate state of the fuel as a result of evaporation or as a result of condensation of fuel vapors. In conventional methods, it is necessary to take these effects into account by means of corresponding application tolerances of the threshold values. In the method according to the invention, these effects flow directly into the method's implementation or, respectively, evaluation, and therefore a greater degree of selectivity in the leak diagnosis is achieved. The leak detection thresholds can be significantly lowered beneath the conventional or as the case may be legally required threshold of 0.5 mm. This is especially advantageous in multi-part tank systems, which have to be diagnosed in the individual subspaces thereof using correspondingly low threshold values. In addition, lower threshold values possibly legally required in the future can be readily diagnosed in a reliable manner using the method.

In order to determine the expected pressure change, provision is preferably made by the invention for at least the following steps. First of all, the equilibrium vapor pressure of the fuel (HC) is determined as a partial pressure at a given temperature. As a function of the temperature, an equilibrium between the fuel vapors (gas phase) and the liquid phase results for each fuel. Said equilibrium vapor pressure $\Delta_{HCequi}$ can be described as a function of the temperature for every fuel. On the basis of the dependence of the equilibrium vapor pressure on the temperature, said equilibrium vapor pressure is determined at a known temperature. As a rule, a deviation exists between this theoretical equilibrium vapor pressure $\Delta_{HCequi}$ and the actual vapor pressure. At a first summation point, the deviation between $\Delta_{HCequi}$ and a modeled partial pressure $\Delta_{HC}$ is determined. The modeled partial pressure $\Delta_{HC}$ reflects the actual vapor pressure of the fuel. In a further step, the evaporation rate of the fuel is determined. This preferably takes place under the assumption that the evaporation rate is substantially proportional to the deviation between $\Delta_{HCequi}$ and $\Delta_{HC}$.

In order to take the HC mass into account, which flows out of the tank system through an assumed leak, the net evaporation rate is determined at a further summation point as the difference between the evaporation rate determined in the previous step and a modeled HC leakage flow. By integrating the net evaporation rate over time, the vaporous HC mass is determined. The vaporous HC mass represents the gas phase of the fuel in the tank system or in the tank receptacle. As a function thereof whether the evaporation rate or the HC leakage flow is greater, the temporal change in the HC mass is positive or negative. While taking into account the given volume in the tank system at a given temperature as well as while taking into account a density factor, the partial pressure $\Delta_{HC}$ can be determined from the vaporous HC mass, said partial pressure $\Delta_{HC}$ entering as the modeled partial pressure $\Delta_{HC}$ into the step described above for determining the deviation between $\Delta_{HCequi}$ and the modeled partial pressure $\Delta_{HC}$.

Corresponding to the modeling of the change in the partial pressure $\Delta_{HC}$, the change in the partial pressure of the air $\Delta_{air}$ is also determined. In so doing, the process is simplified by the fact that only the leakage mass flow has to be taken into account for the modeling of the change in the air mass in the tank. An evaporation term or, respectively, a condensation term does not have to but can additionally be taken into account. In a preferable manner, the initial air flow is integrated over time while taking into account the air leakage flow in order to determine the total air mass in the receptacle, in particular in the tank system. While taking into account a density factor, the partial pressure of the air $\Delta_{air}$ can be calculated from the total air mass at a known volume and at a known temperature, said partial pressure of the air $\Delta_{air}$ entering into the calculation of the total mass escaping through a leak of predetermined size.

Using the partial pressures for air and HC modeled now, a modeled total pressure results as a sum of the two partial pressures. From the modeled or also alternatively measured total pressure, a leakage mass flow at a predetermined leak size can be calculated using known methods of thermodynamics. When dividing the leakage mass flow into the air and HC proportions, it is assumed that air and HC vapor in the tank is sufficiently uniformly mixed, and therefore the partial mass flows behave according to the mass concentrations which can be derived from the partial pressures.

The HC proportion of the modeled leakage flow is used as described above for the determination of the net evaporation rate as the difference between the evaporation rate and the modeled HC leakage flow.

The modeled total pressure is now compared with the measured total pressure for the purpose of detecting an O.K. system or a fault. If (in the typical example of a positive pressure in the tank) the measured pressure increase is now slower than the pressure increase modeled with the assumption of a certain leak size, it can thereby be concluded that a leak is present, which is larger than the leak size assumed for the calculation. Conversely it can be concluded that a smaller leak or in the ideal case that no leak at all is present if the measured pressure increase is faster than the modeled pressure increase. In the case of a negative pressure (which is however rarely present in such a tank system), the conclusion analogously reverses: if the actual leak size is larger than that assumed in the calculation, air from outside flows into the tank and the actual negative pressure builds up slower than modeled. In the case of a tank with a smaller leak, the negative pressure will on the other hand build up faster than in accordance with the model calculation because the amount of air flowing in from the outside is less.

This method relates to a closed calculation algorithm, with which an expected pressure change for a certain leak size can be calculated over time when the temperature is known and when the proportionality of the evaporation rate with respect to the deviation of the equilibrium vapor pressure from the actual or, respectively, modeled vapor pressure of the fuel is assumed as previously described. This expected pressure change for a certain leak size is compared with the actually measured pressure change. Depending upon whether the actual pressure change is smaller or larger than the pressure change determined by calculation, a leak can be inferred which is larger or smaller than the leak size which is the basis for the calculation.

In such closed methods, it is necessary, as is known, to know the initial conditions. In order to obtain realistic values for said initial conditions, the assumption is made under certain basic conditions (e.g. if the vehicle has been shut down for a longer period of time and no drastic temperature fluctuations occurred) that the tank system is close to the equilibrium thereof. The partial pressure $\Delta_{HC}$ can thereby be set equal to the equilibrium vapor pressure $\Delta_{HCequi}$. The partial pressure of the air $\Delta_{air}$ then results as the difference between the measured total pressure and the HC equilibrium vapor pressure. Hence, the initial conditions for the closed algorithm are known.

In a preferred embodiment of the method according to the invention, the predetermined leakage size or leak size corresponds to a leak having a diameter of 0.1 mm to 0.8 mm, preferably 0.3 mm to 0.6 mm. A predetermined leak size having a diameter of 0.5 mm is particularly preferred. 0.5 mm corresponds to the threshold for the diagnosis of tank leaks which is currently required by law. It can be particularly advantageous in multi-part tank systems for a lower threshold, for example a diameter of 0.3 mm, to be the basis of the calculation.

In a preferred embodiment of the method according to the invention, the temperature, which is taken into account according to the invention, is measured in the tank system. Provision is preferably made in this case for a suitable temperature sensor. In addition or as an alternative thereto, the temperature in the tank system can be estimated. This can, for example, take place through the use of a corresponding model, which reflects the balance of heat inputs. By measuring the temperature in the tank system, the temperature can be acquired if need be more exactly and more reliably. The estimation of the temperature via suitable models has the advantage that additional sensors, in particular temperature sensors, are not required in the tank system. When estimating the temperature, which can be performed in a suitable control device, only a pressure sensor in the tank system is necessary for the method according to the invention, said pressure sensor being provided to acquire the pressure changes. The actual pressure change can be acquired with one or several conventional pressure sensors.

In a further preferred embodiment, the outside temperature is used for determining the temperature in the tank system. The implementation of the tank leak diagnosis according to the invention is preferably performed with a time delay after the measurement of the outside temperature, for example approximately one hour, in order to facilitate if need be an equalization of the temperature in the tank system to the outside temperature.

In a preferred embodiment of the method according to the invention, the course of the vapor pressure of a fuel is taken into account as a function of the temperature in order to determine the expected pressure change. Said course of the fuel vapor pressure curve is, for example, deposited and accessed in a control device. It is especially advantageous for a vapor pressure curve of a typical fuel to be used. In this case, said typical fuel particularly relates to a fuel, the use of which is to be expected in the motor vehicle when the method for detecting leaks is being carried out.

In a particularly preferred manner, a plurality of vapor pressure curves or, respectively, courses of the vapor pressure is deposited as a function of the temperature for various fuels. According to this embodiment, a suitable vapor pressure curve is then selected and taken into account for the method according to the invention. Preferably the vapor pressure curve of that fuel is selected and taken into account which is actually used in the motor vehicle or which is closest thereto. The behavior of different fuels with respect to pressure changes in the tank system, which are acquired according to the invention, can significantly vary from one another. This can lead to inaccuracies in the leak detection. For this reason, provision is made according to the invention for this varying behavior of the different fuels to be taken into account by the vapor pressure curve of the fuel which is actually used being employed in the inventive method. The selection of an appropriate vapor pressure curve can take place using different criteria. For example, a detection of the respective fuel can be performed according to conventional methods in order to then select the corresponding vapor pressure curve using this information.

In a particularly preferred embodiment, the fuel volatility is determined for this purpose and the corresponding curve is selected using this criterion. Taking the volatility or, respectively, the fugacity of the fuel into account, said volatility being different as a rule in winter and summer fuel, is particularly advantageous because the volatility of the respective fuel has a significant effect on the pressure changes in the tank system acquired according to the invention. In other embodiments, the fuel detection can, for example, be performed using a fuel quality sensor, with which behaviors of exhaust gas values during dynamic load changes (transition compensation) or the behavior of the engine during start-up (start adaptation) can be ascertained. Another possibility, which allows for inferences about the fuel used in each case, is the taking into account of the season of the year, the taking into account of the geographical location of the motor vehicle, for example by means of satellite systems, or the observation of the longer-term course of the ambient temperature.

In a preferred embodiment of the method according to the invention, the pressure fluctuations externally caused are natural pressure fluctuations, i.e. pressure fluctuations which are not based on separate pressure sources. Examples of these are varying ambient pressures. In other preferred embodiments, the pressure fluctuations which are externally caused can be caused by separate pressure sources by, for example, air being pumped into the tank (positive pressure) or gas being sucked out of the tank (negative pressure). A negative pressure in the tank system can, for example, be achieved as a result of the negative pressure prevailing in the intake manifold of the internal combustion when said engine is idling. The corresponding positive or negative mass flows are correspondingly taken into account in the method according to the invention in a very advantageous manner.

The invention further comprises a computer program, which executes the steps of the method described if said program is run on a computer, for example in a control device. Finally the invention comprises a computer program product with program code, which is stored on a machine-readable carrier, for carrying out the method described if the program is executed on a computer or in a control device. It is very advantageous for the computer programs or, respectively, computer program products for detecting leaks in tank systems or for the tank leak diagnosis in motor vehicles to be executed in corresponding control devices.

Further advantages and features of the invention ensue from the following description of the figures in conjunction with the exemplary embodiments. The different features can thereby in each case be implemented by themselves or in combination with one another.

DETAILED DESCRIPTION

Figure 1:
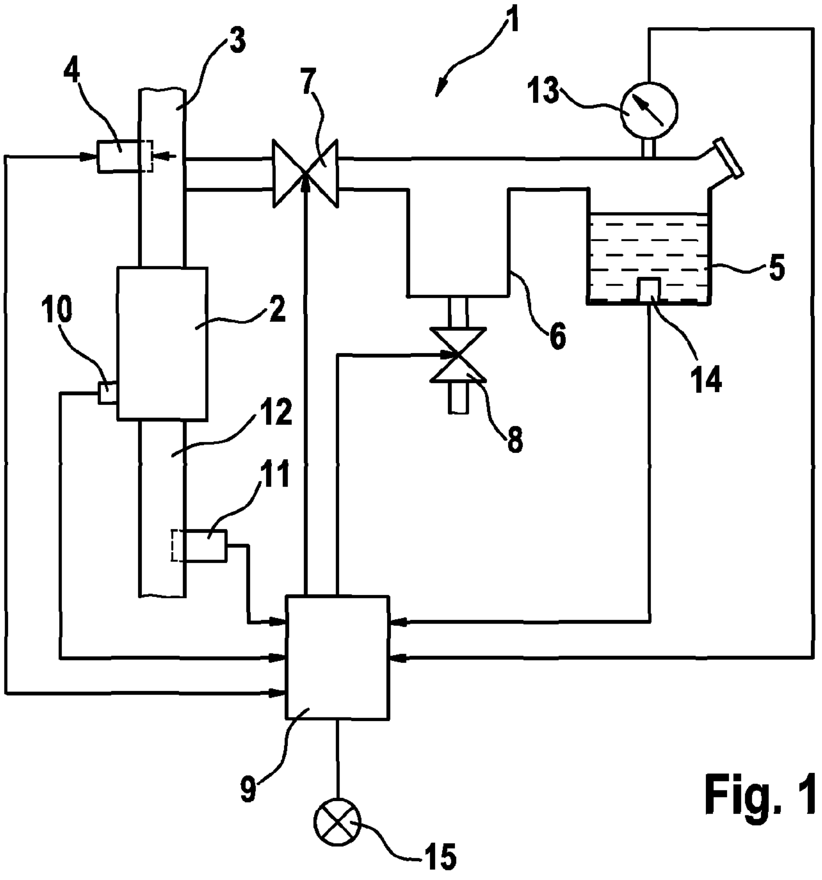
FIG. 1 shows a schematic depiction of a tank system for carrying out the method according to the invention.

The tank system 1 shown in FIG. 1 comprises an internal combustion engine 2, to which fuel from a tank 5 is supplied via an intake manifold 3 and a fuel metering means 4. Vaporizing fuel or rather fuel vapors from the tank 5 is collected and stored in an active charcoal filter 6. By opening a tank ventilation valve 7, the stored fuel vapors can be delivered to the internal combustion engine 2 via the intake manifold 3. For this purpose, fresh air is drawn in via an open shutoff valve 8, said fresh air rinsing the active charcoal filter 6 on account of the pressure ratios occurring, absorbing the fuel vapors and delivering said vapors to the internal combustion engine 2. A control device 9 is provided to control the valves 7 and 8. Signals, which represent the operating state of the internal combustion engine 2 as, e.g., rotational speed, load and if need be further variables are delivered to the control device 9 via a sensor 10. Signals regarding the exhaust gas are conveyed to the control device 9 via an exhaust gas sensor 11 in the exhaust duct 12. A pressure sensor 13 provides signals which represent the pressure in the tank ventilation system, for example in the tank 5. According to the invention, these items of information concerning the pressure changes occurring in the tank 5 or, respectively, in the tank system in response to externally caused pressure fluctuations are compared with an expected pressure change and the presence of leaks in the tank system 1 is inferred. The externally caused pressure fluctuations can be brought about by changing ambient conditions or by targeted interventions. The fuel vapors can be sucked out of the tank system, in particular out of the tank 5 and out of the active charcoal filter 6, by closing the valve 8 and opening the valve 7 by means of the negative pressure prevailing in the intake manifold 3 of the internal combustion engine 2, and therefore a negative pressure develops in the tank ventilation system. If a certain negative pressure level is achieved, the tank ventilation system is closed by closing the valve 7. Via the pressure sensor 13, it is observed over time to what extent and with what speed said negative pressure is reduced. When determining the expected pressure change, which is compared with the actual pressure change, the influence of the temperature in the tank system is taken into account. For this purpose, a temperature sensor 14 is preferably provided in the tank system. In other embodiments, a temperature sensor is not present, but on the contrary temperature is determined via an estimation, which is particularly performed in the control device 9. An error lamp 15 is associated with the control device 9, the former being able to indicate the diagnostic result.

Figure 2:
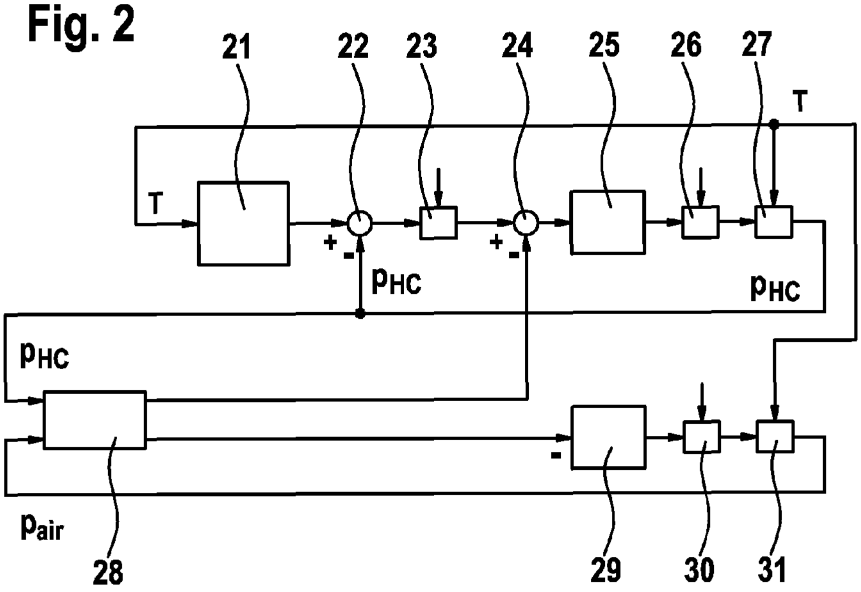
FIG. 2 shows a block diagram for determining the expected pressure change pursuant to a preferred embodiment of the method according to the invention.

The block diagram shown in FIG. 2 reflects the steps which can be carried out for determining the expected pressure change in the tank system as a function of the temperature. Said steps are preferably carried out in the control device of a motor vehicle. The initial point is a vapor pressure curve of one or a plurality of fuels, i.e. the course of the vapor pressure as a function of the temperature for a certain fuel. If need be, a vapor pressure curve which corresponds to the behavior of the fuel actually used or which closely approximates the same can be selected from a plurality of vapor pressure curves. In step 21 the equilibrium vapor pressure for the fuel vapors $\Delta_{HCequi}$ is determined from said vapor pressure curve on the basis of the given temperature. In step 22 the difference between the equilibrium vapor pressure $\Delta_{HCequi}$ and a modeled partial pressure $\Delta_{HC}$ is formed. The modeled partial pressure $\Delta_{HC}$ is formed in steps 26 to 27 subsequently described. An evaporation rate of the fuel is determined in step 23 from the difference or the deviation between $\Delta_{HCequi}$ and $\Delta_{HC}$ while taking into account an evaporation constant, which characterizes the vapor forming strength as a function of the deviation from the equilibrium, e.g. 0.25 g/hPa h. This takes place under the assumption that the evaporation or, respectively, condensation rate is proportional to the distance of the vapor pressure from equilibrium (linear model). A modeled HC leakage mass flow for determining the net evaporation rate is deducted from said evaporation rate in step 24. The formation of the modeled HC leakage mass flow is explained subsequently in step 28. The total HC mass in the gas phase ensues from the integration of said difference over time in step 25. The partial pressure $\Delta_{HC}$ is calculated from said total HC mass in the gas phase using the ideal gas law in steps 26 and 27 at a known volume, at a known temperature and while taking into account a density factor. Said partial pressure enters step 22 as an input variable. The total pressure in the tank results as a sum of the partial pressure $\Delta_{HC}$ and the partial pressure $\Delta_{air}$, the calculation of which is described in steps 29 to 31. In step 28, a calculation is made using $\Delta_{HC}$ and $\Delta_{air}$ at a predetermined leak size, for example having a diameter of 0.3 mm or 0.5 mm, as to which mass flow of HC (HC leakage flow) and which mass flow of air (air leakage flow) is flowing out of this leak or, respectively, in the case of a negative pressure as to how much air is flowing into the leak. The calculation of mass flows through a leak of a certain size is known to the specialist in the field and can be determined, for example, with the aid of the so-called choking equation. The HC proportion of the leak mass flow (HC leakage flow) enters into the formation of the difference between the evaporation rate of the fuel and the modeled HC leak mass flow in step 24. The integration of the initial mass of air while taking into account the air leakage flow over time in step 29 yields the total mass of the air in the gas phase of the tank. In steps 30 and 31, the partial pressure of the air $\Delta_{air}$ is calculated from the air mass by means of the ideal gas law once again while taking into account temperature and volume and a density factor. The calculated partial pressure of the air $\Delta_{air}$ enters into step 28.

It is necessary in the case of such a recursive calculation algorithm to know the initial conditions at the beginning of the calculation: in this case the partial pressures for HC and for air. For this purpose, it is assumed, e.g., after extended shutdown phases, in which large temperature fluctuations have also not taken place, that the tank system is at least close to equilibrium. As an initial condition, $\Delta_{HC}$ can therefore be set equal to $\Delta_{HCequi}$, which is calculated in step 22 from the data sets deposited in the control device and the measured or modeled temperature in the tank. In the case of a ventilated tank, the total pressure in the tank results as a rule from the atmospheric pressure. In a closed tank system, the total pressure can, for example, be determined via a pressure sensor or the current consumption of a pump. Hence, the initial value for the partial pressure of the air is obtained as the difference between the acquired total pressure and the initial value for $\Delta_{HC}$.

In this way, the expected pressure changes can be calculated for an assumed leak size. This occurs while taking the actual temperature into account. Said temperature can result, for example, from a temperature measurement in the tank or from an estimation of the temperature in the manner described. The calculated value, i.e. the change in the sum of $\Delta_{HC}$ and $\Delta_{air}$ over time, is compared with measured values for pressure changes. This allows the presence of a leak above the assumed leak size to be inferred as the threshold value. If, for example, a leak size having a diameter of 0.3 mm should be detected as the threshold value, the calculation method is used while taking the leak size of 0.3 mm into account. If, in the case of positive pressure in the system, the measured pressure gradient is more positive than the modeled pressure gradient, it can thereby be assumed that actually fewer gas losses take place by leakage than correspond to a 0.3 mm leak. The system can therefore be identified as being O.K. In the case of negative pressure in the system, an O.K. system is inferred if the measured pressure gradient is more negative than the pressure gradient modeled with a 0.3 mm leak. This is the case because the conclusion can be drawn therefrom that less gas is flowing in through leaks. In the respective, logical reversal of the two cases described, a system is in contrast inferred which has a larger leak than the assumed 0.3 mm.

The calculation model depicted in FIG. 2 is based on natural pressure fluctuations, which therefore do not comprise any supply or removal of air or gas mass flows into or out of the system. The method can however be applied to separate pressure sources, which bring with them a supply or removal of gases in the system. In the case, that air is pumped into the tank or the tank system to generate a positive pressure, the additional air mass flow is taken into account with plus signs in the integrator pursuant to step 29. If gas is sucked out of the system to generate a negative pressure, the air or HC proportion is taken into account with minus signs in both integrators in steps 25 and 29.

The vapor pressure curve used in step 21 can reflect the progression of the vapor pressure as a function of the temperature for a typical fuel. In other particularly preferred embodiments, two or more fuel-vapor pressure curves can be deposited at this location. In order to carry out the method, one of said vapor pressure curves is selected, which reproduces the behavior of the fuel actually used or which most closely approximates said behavior. The selection of the respective, suitable fuel-vapor curve results in a preferable manner on the basis of a determination of the fuel actually used. Said determination can take place on the basis of concrete variables which characterize the fuel used, for example by means of measuring the fuel quality or the fuel volatility. Furthermore, the fuel can be detected or, respectively, determined on the basis of the behavior of the exhaust gas value, for example on the basis of the air ratio lambda, under dynamic changes of load (transition compensation) or by the behavior of the engine during start-up (start adaptation). In addition, the fuel being used can be inferred from different indicators, for example from the season, from the geographical location of the motor vehicle or from the longer-term course of the ambient temperature.

The invention claimed is:

1. A method for detecting leaks in a tank system, wherein the presence of leaks is inferred from pressure changes in the tank system in response to externally caused pressure fluctuations, wherein the effect of the temperature in the tank system is taken into account in that an expected pressure change in the tank system for a predetermined leak size is determined as a function of the temperature, and the presence of leaks is inferred from the comparison of an actual pressure change to the expected pressure change, wherein in order to determine the expected pressure change the following steps are involved:

determining, by a control system, the equilibrium vapor pressure as the partial pressure of the fuel (HC) $\Delta_{HCequi}$ at a given temperature, determining, by the control system, the deviation between $\Delta_{HCequi}$ and a modeled partial pressure of the fuel $\Delta_{HC}$, determining, by the control system, an evaporation rate of the fuel from the deviation between $\Delta_{HCequi}$ and $\Delta_{HC}$, determining, by the control system, the net evaporation rate as the difference between the evaporation rate and a modeled HC leak flow, integrating, by the control system, the net evaporation rate over the time for determining the vaporous HC mass, determining, by the control system, the modeled partial pressure $\Delta_{HC}$ from the vaporous HC mass at a given volume and given temperature and determining, by the control system, the modeled HC leak flow on the basis of the modeled $\Delta_{HC}$ at a given partial pressure of the air $\Delta_{air}$ at a predetermined leak size.

2. The method according to claim 1, wherein the predetermined leak size corresponds to a leak having a diameter of 0.1 mm to 0.8 mm, preferably 0.3 mm to 0.6 mm.

3. The method according to claim 1, wherein the temperature in the tank system is measured or estimated.

4. The method according to claim 1, wherein the course of the vapor pressure of a fuel is taken into account as a function of the temperature.

5. The method according to claim 4, wherein the courses of the vapor pressure are deposited as a function of the temperature for at least two fuels and one course is selected and taken into account.

6. The method according to claim 5, wherein the selection of a course results by taking factors into account which allow for a certain fuel to be inferred, wherein the factors fuel volatility, fuel quality, exhaust gas values at dynamic load changes, engine behavior at start-up, season of the year, geographical location and/or ambient temperature course are preferably included.

7. The method according to claim 1, wherein the externally caused pressure fluctuations are natural pressure fluctuations.

8. The method according to claim 1, wherein the externally caused pressure fluctuations are caused by separate pressure sources.

9. A motor vehicle comprising:

an engine having an intake manifold in fluid communication with a fuel tank; and a control device in electrical communication with the engine, the control device comprise computer code that when executed preforms a method for detecting a leak within the fuel tank, the method comprising:

receiving, at the control device, a temperature measurement, determining, at the control device, an equilibrium vapor pressure as a function of a partial pressure of a fuel located within the tank, the partial pressure of the fuel being a function of the temperature measurement, determining, at the control device, a modeled partial pressure of the fuel, determining, at the control device, an evaporation rate of the fuel, the evaporation rate being assumed to be substantially proportional to a deviation between the partial pressure of the fuel and the modeled partial pressure of the fuel, determine, at the control device, a modeled fuel leak based on a predetermined leak size, and determine, at the control device, a net evaporation rate, the net evaporation rate being a function of the evaporation rate and the modeled fuel leak.

10. The motor vehicle of claim 9, wherein the temperature measurement is received from a temperature sensor and indicates ambient temperature.

11. The motor vehicle of claim 9, wherein the temperature measurement is an estimate temperature.

12. The motor vehicle of claim 9, wherein determining the model fuel leak comprises accounting for a fuel consumption by the engine.

* * * * *

UNITED STATES PATENT AND TRADEMARK OFFICE

CERTIFICATE OF CORRECTION

PATENT NO. : 8,706,343 B2
APPLICATION NO. : 12/995950
DATED : April 22, 2014
INVENTOR(S) : Martin Streib It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 603 days.

Signed and Sealed this
Twenty-ninth Day of September, 2015

*Michelle K. Lee*

Michelle K. Lee
*Director of the United States Patent and Trademark Office*